United States Patent [19]

Berkman

[11] 4,117,931

[45] * Oct. 3, 1978

[54] CASE FOR DIFFERENTLY SIZED MAGNETIC TAPE ENCLOSURES

[76] Inventor: Joseph L. Berkman, 48 Country Rd., Mamaroneck, N.Y. 10543

[*] Notice: The portion of the term of this patent subsequent to Jan. 18, 1994, has been disclaimed.

[21] Appl. No.: 745,248

[22] Filed: Nov. 26, 1976

Related U.S. Application Data

[63] Continuation-in-part of Ser. No. 561,315, Mar. 24, 1975, Pat. No. 4,003,468, and a continuation-in-part of Ser. No. 744,467, Nov. 24, 1976.

[51] Int. Cl.² .................. B65D 85/30; B65D 85/62
[52] U.S. Cl. ..................................... 206/387; 206/561; 206/564; 211/40
[58] Field of Search ............. 206/387, 561, 564, 454, 206/455, 449; 312/200; 211/40

[56] References Cited

U.S. PATENT DOCUMENTS

| | | | |
|---|---|---|---|
| 2,286,175 | 6/1942 | Wackman | 220/94 R |
| 3,756,383 | 9/1973 | Kryter | 206/387 |
| 3,856,369 | 12/1974 | Commiant | 206/387 |
| 3,907,116 | 9/1975 | Wolf et al. | 206/387 |
| 4,003,468 | 1/1977 | Berkman | 206/387 |

Primary Examiner—William Price
Assistant Examiner—Joseph M. Moy
Attorney, Agent, or Firm—Lackenbach, Lilling & Siegel

[57] ABSTRACT

A case in the nature of a storage device with or without a cover or a valise or attache-type case comprising parallel rows of magnetic tape enclosure storage compartments. Each compartment is molded to form a somewhat thicker and narrower space to securely receive a standard 8-track cartridge and, within a substantially coextensive space, a somewhat thinner and wider space to securely receive a standard cassette storage box so that both types of commonly used magnetic tape enclosures may be interchangeably received and stored within the compartment without excessive movements and dislocations within the case during transit. In one embodiment, the cover is transparent and may be adapted to be removable and, in another embodiment, the cover is integrally molded with the case.

15 Claims, 13 Drawing Figures

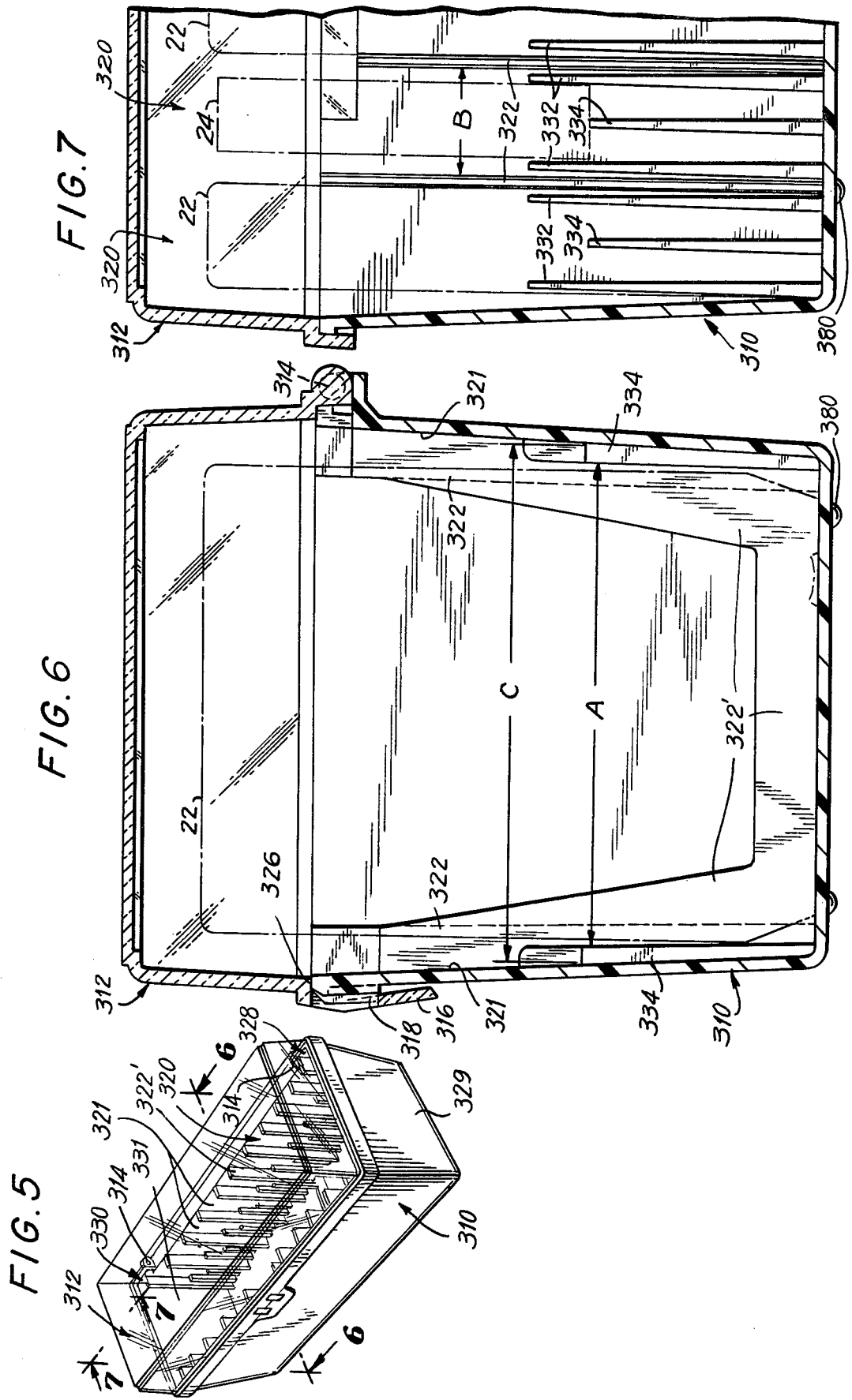

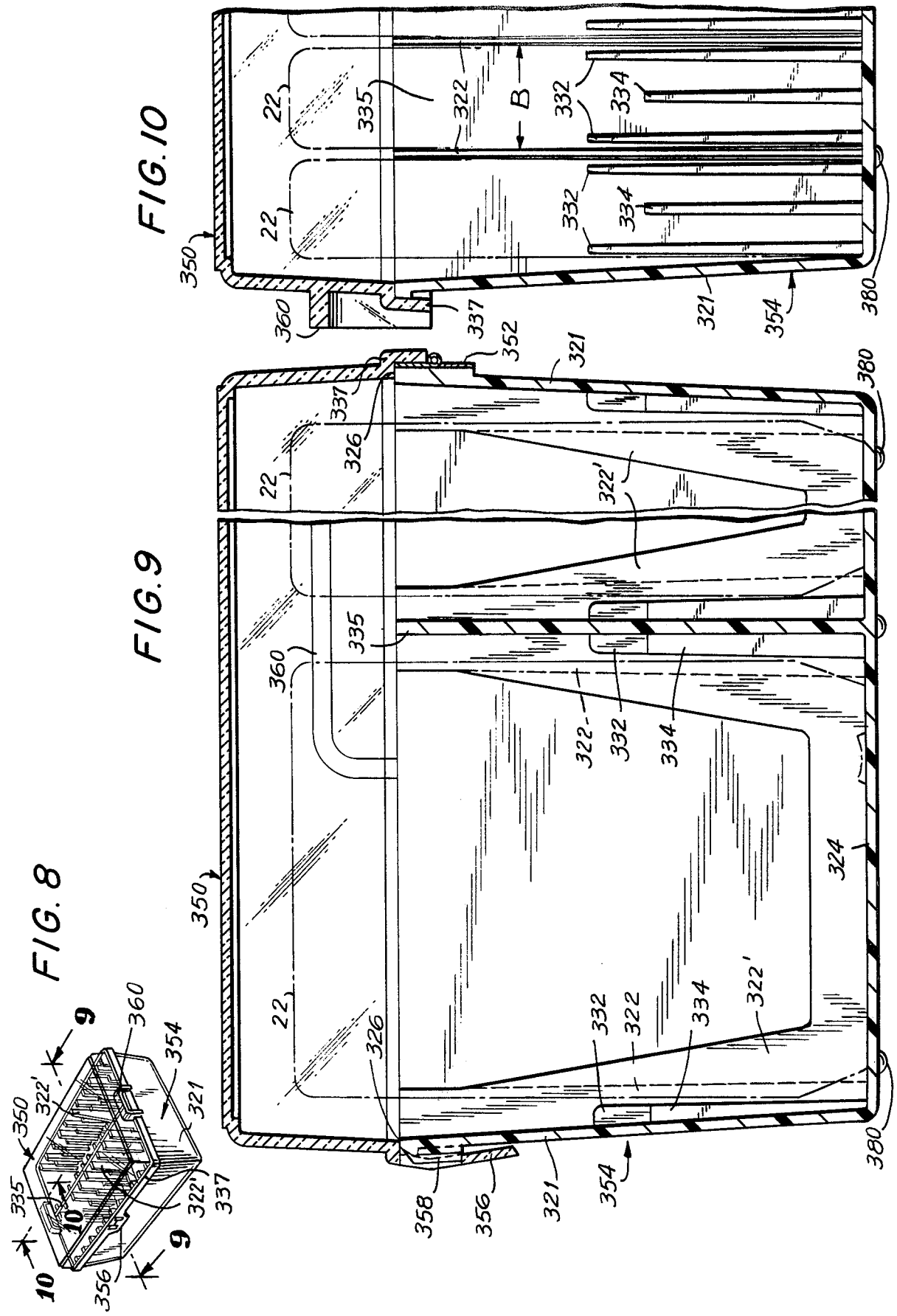

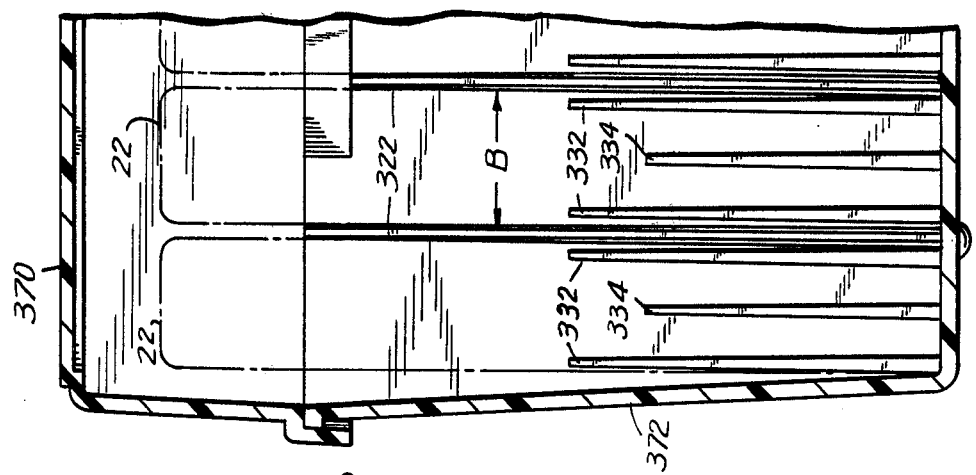
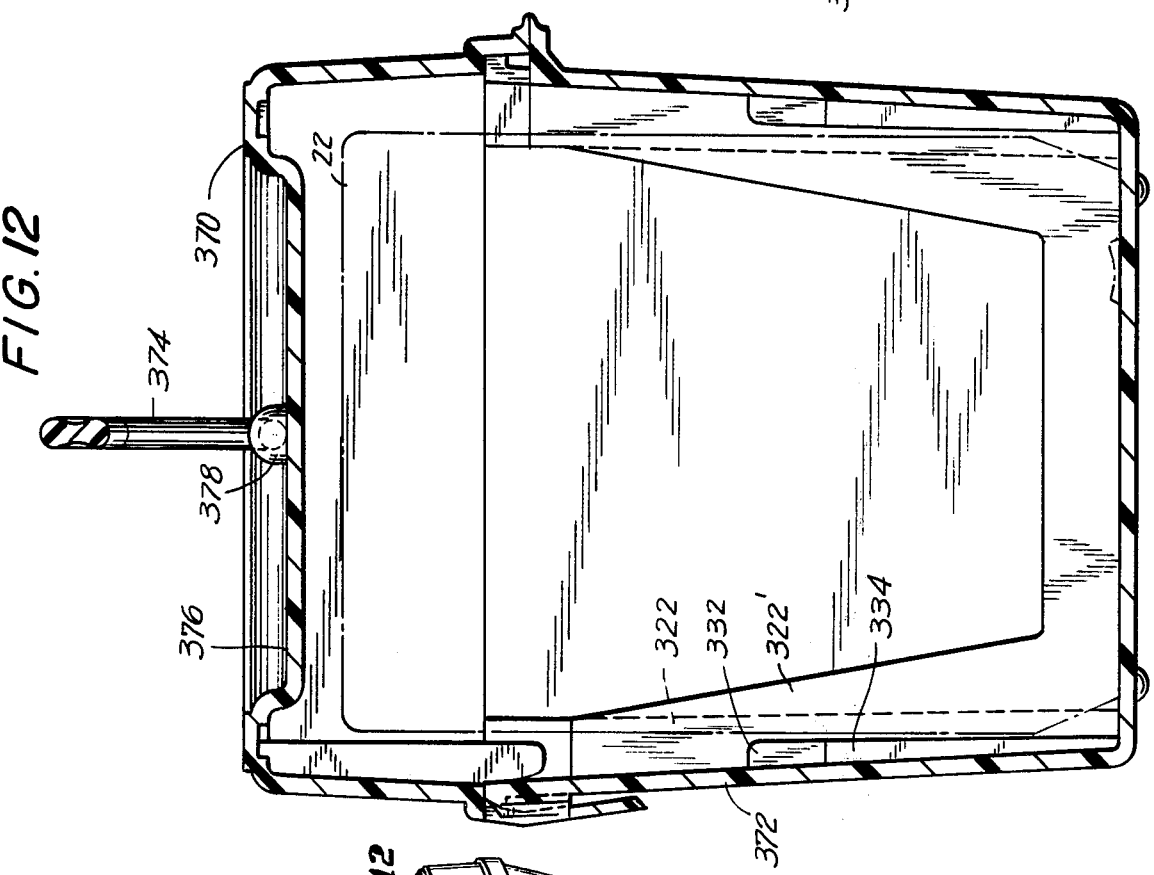
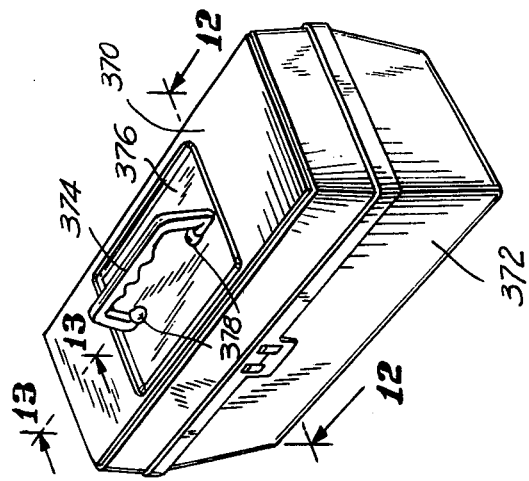

CASE FOR DIFFERENTLY SIZED MAGNETIC TAPE ENCLOSURES

CROSS REFERENCE TO RELATED APPLICATION

This is a continuation-in-part application of U.S. patent application, Ser. No. 561,315, filed Mar. 24, 1975; now U.S. Pat. No. 4,003,468, granted Jan. 18, 1977; and a continuation-in-part application of U.S. patent application, Ser. No. 744,467, filed Nov. 24, 1976.

BACKGROUND OF THE INVENTION

This invention generally relates to magnetic tape storage devices, and more specifically to a case in the form of a cabinet module or valise for interchangeably receiving and storing two differently sized magentic tape enclosures.

Numerous storage devices are known which are intended to receive magnetic tape enclosures, such as standard 8-track cartridges or cassettes. All of the known devices are suitable for receiving only one of the aforementioned types of magnetic tape enclosures. Accordingly, it has been necessary in the past to acquire two storage devices, one for 8-tracks, and one for cassettes. This has resulted in unnecessary inconvenience and expense.

In my earlier filed application Ser. No. 382,302, for a RACK (now U.S. Pat. No. 3,889,817), I have taken the first step towards solving the problems of the prior art because there is disclosed a number of stackable rack elements and a rack assembled therefrom for interchangeably receiving and storing both magnetic tape cartridges and cassettes. However, the device described in my prior application is in the nature of a carousel which may be turned to bring successive tapes into view for facilitatting selection, but is not in the nature of the case and the insert for the case that is disclosed and claimed herein.

SUMMARY OF THE INVENTION

Accordingly, it is the object of the present invention to provide cases in the form of a cabinet or valise for magnetic tapes which do not have the above suggested disadvantages of comparable prior art devices.

It is another object of the present invention to provide cases of the type under discussion which are simple in construction and economical to manufacture.

It is still another object of the present invention to provide cases as in the above objects, which are suitable for interchangeably receiving both standard 8-track cartridges as well as cassette storage boxes.

It is yet another object of the present invention to provide cases as in the last object, which includes a number of storage compartments or bins each of which can securely hold a standard 8-track cartridge or a cassette storage box and pevent the latter magnetic tape enclosures from excessive undesired movements within the case during transit.

It is yet a further object of the present invention to provide a storage type case of a construction to provide more permanent storage, and one which provides for closure means, so that the 8-track cartridges or cassettes or both are "sealed" or isolated from contamination by dust particles or the like collecting on the tapes of such magnetic tape enclosures.

It is still another object of the present invention to provide a carrying case in the form of a valise having a handle and latched cover or closure, and one which is capable of being used to provide a storage unit or device which is adapted to be used in transporting tapes, for example, to and from an automobile.

Yet a still further object of the present invention is to provide a cabinet module or device having a top closure, which may be transparent, and which is particularly adapted for the more permanent storing of a plurality of magnetic tape enclosures.

Yet still another object of the present invention is to provide a case having a cover or closure which is integrally molded together as a unit, and is of the type having built-in storage compartments, thereby eliminating the need for an insert adapted to interchangeably receive and store two differently sized magnetic tape enclosures.

Accordingly, in order to achieve the above objects, as well as others which will become apparent hereafter, cases embodying closures in accordance with the present invention are described below which are suitable for interchangeably receiving and storing two differently sized magnetic tape enclosures having generally rectangular configurations. The first enclosure has a smaller width and a greater thickness than the corresponding dmensions of the second enclosure. The cases in accordance with the present invention comprise a plurality of tandem storage compartments arranged in rows, each of which is adapted to interchangeably receive a first and a second dimensioned magnetic tape enclosure. Each compartment is generally rectangular in configuration and bounded on two sides by two substantially parallel wall portions spaced from each other a first predetermined distance approximately equal to the width of the first enclosure to securely receive the same therebetween. A further wall portion is provided which is substantially normal to said parallel wall portions. Each compartment is open on one side thereof opposite said further wall portion for receiving the enclosures. Guide means are provided which at least partially bound said wall portions of each compartment to define a space having a thickness equal to a second predetermined distance approximately equal to the thickness of the first enclosure for guiding the first enclosures into said compartments and preventing the first enclosures from moving transversely therein. In the presently preferred embodiment, elongated rectangular recesses are provided in said spaced parallel wall portions of each compartment which open at the compartment open end and extend toward said further wall portions. Each recess forms retaining wall portions which define a space having a width greater than said first predetermined distance and a thickness smaller than said second predetermined distance suitable for securely receiving a second enclosure to thereby prevent transverse movements of a second enclosure within said compartments. In this manner, each compartment can interchangeably receive either a first or a second enclosure and maintain each securely therein by insertion through an associated compartment open end and respective cooperation with either said guide means or said retaining wall portions of said recesses.

According to other embodiments of the invention, there is provided a case having side and end walls adapted for interchangeably receiving and storing two differently sized magnetic tape enclosures having generally rectangular configurations, the first enclosure having a smaller width and a greater thickness than the corresponding dimensions of the second enclosure, and having a height greater than the height of the second enclosures. The case has at least one row of tandem storage compartments, at least one of which is adapted to interchangeably receive a first or a second dimensioned magnetic tape enclosure, and said compartment is generally rectangular in configuration and bounded on two sides by wall portions spaced from each other a first predetermined distance approximately equal to the width of the first enclosure to receive the same therebetween and a further wall portion substantially normal to said wall portions. The compartment being open on the side thereof opposite said further wall portion for receiving the enclosures. Guide means at least partially bounding said wall portion of said compartment define a space having a thickness equal to a second predetermined distance approximately equal to the thickness of the first enclosure for guiding the first enclosure into said compartment and prevent the first enclosure from moving therein. Wall means spaced from said wall portions and cooperating therewith form an elongate rectangular recess which opens at said compartment open end and is spaced from said further wall portion so as to form a depth limiting shoulder or ledge adapted to maintain at least a portion of said second enclosure projecting above said wall portions upon full insertion of said second enclosure into said compartment. Each recess forms retaining wall portions which define a space having a width greater than said first predetermined distance and a thickness smaller than said second predetermined distance suitable for securely receiving a second enclosure to thereby prevent movements of a second enclosure within said compartment.

The present invention will be better understood and the objects and important features, other than those specifically enumerated above, will become apparent when consideration is given to the following details and description, which when taken in conjunction with the annexed drawing, describes, discloses, illustrates and shows a preferred embodiment or modification of the present invention and what is presently considered and believed to be the best mode of practice in the principles thereof. Other embodiments or modifications may be suggested to those having the benefit of the teachings herein and such other embodiments or modifications are intended to be reserved especially as they fall within the scope and spirit of the subjoined claims.

BRIEF DESCRIPTION OF THE DRAWINGS

FIG. 5 is a perspective view of yet another modification of my dual or interchangeable cartridge and cassette storage case in the closed condition;

FIG. 6 is a cross-sectional view taken along the line 6—6 of FIG. 5;

FIG. 7 is a partial cross-sectional view taken along the line 7—7 of FIG. 5;

FIG. 8 is a perspective view of a further alternate embodiment of my dual cartridge and cassette storage case;

FIG. 9 is a cross-sectional view taken along the line 9—9 of FIG. 8;

FIG. 10 is a partial cross-sectional view taken along the line 10—10 of FIG. 8;

FIG. 11 is yet another embodiment of my dual or interchangeable cartridge and cassette storage case with an integrally molded hinged cover;

FIG. 12 is a cross-sectional view taken along the line 12—12 of FIG. 11; and

FIG. 13 is a partial cross-sectional view taken along the line 13—13 of FIG. 11.

DESCRIPTION OF THE PREFERRED EMBODIMENT

Figure 1:
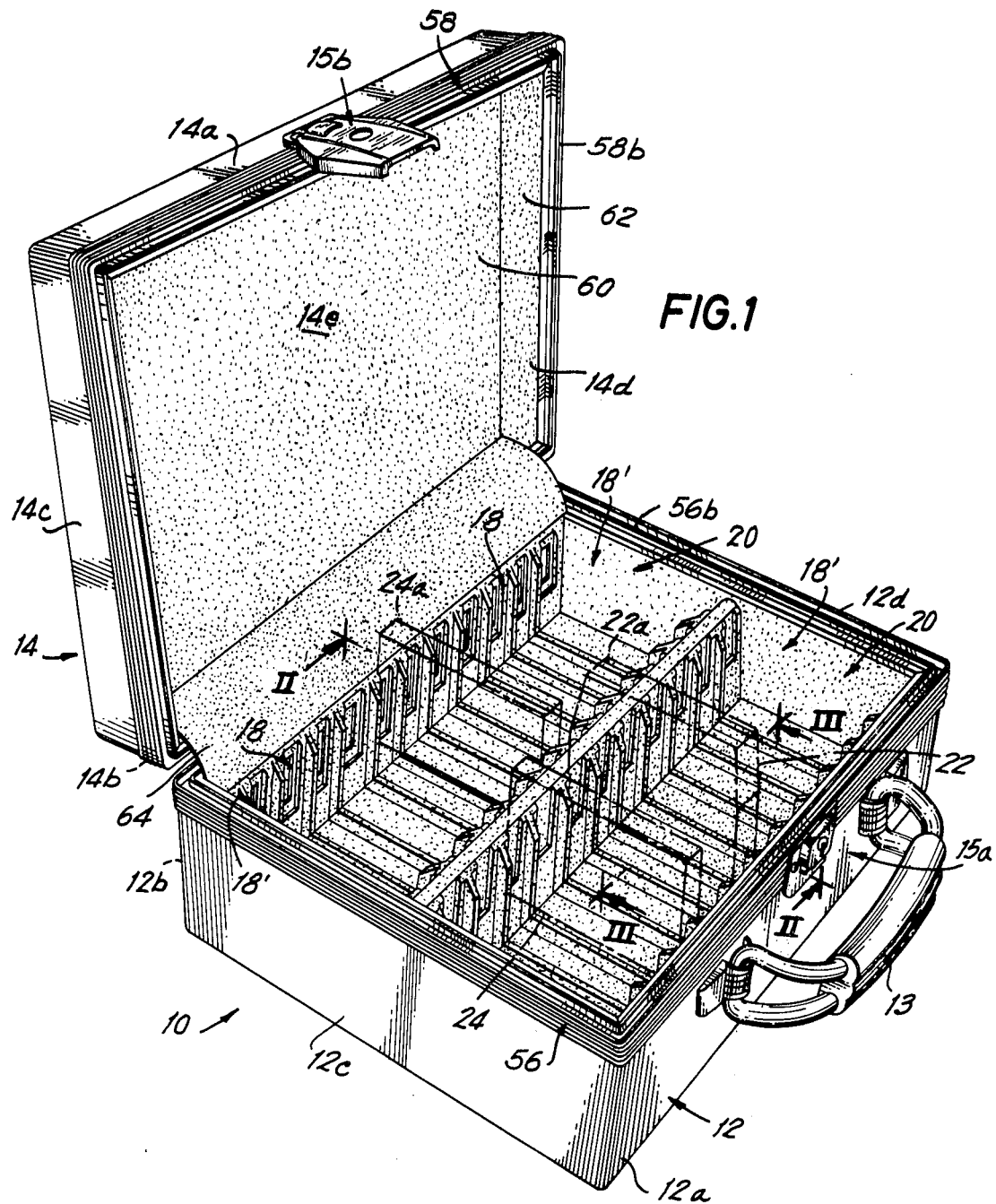
FIG. 1 is a perspective view of a case having two longitudinal rows for magnetic tape enclosures in accordance with the present invention, showing in phantom outline how both standard 8-track cartridges as well as cassette storage boxes can be received and securely maintained within the carrying case.

Referring now specifically to the drawings, in which idential or similar parts are designated by the same reference numerals throughout, and first referring to FIG. 1, the storage case, which in this embodiment is in the form of a valise, is generally designated by the reference numeral 10.

The carrying case 10 has a lower taped receiving portion or receptacle 12 which is generally rectangular in shape and is formed by a front wall 12a, a rear wall 12b, end walls 12c and 12d and a bottom wall 12e. The bottom and rear walls are shown in FIG. 2.

Figure 2:
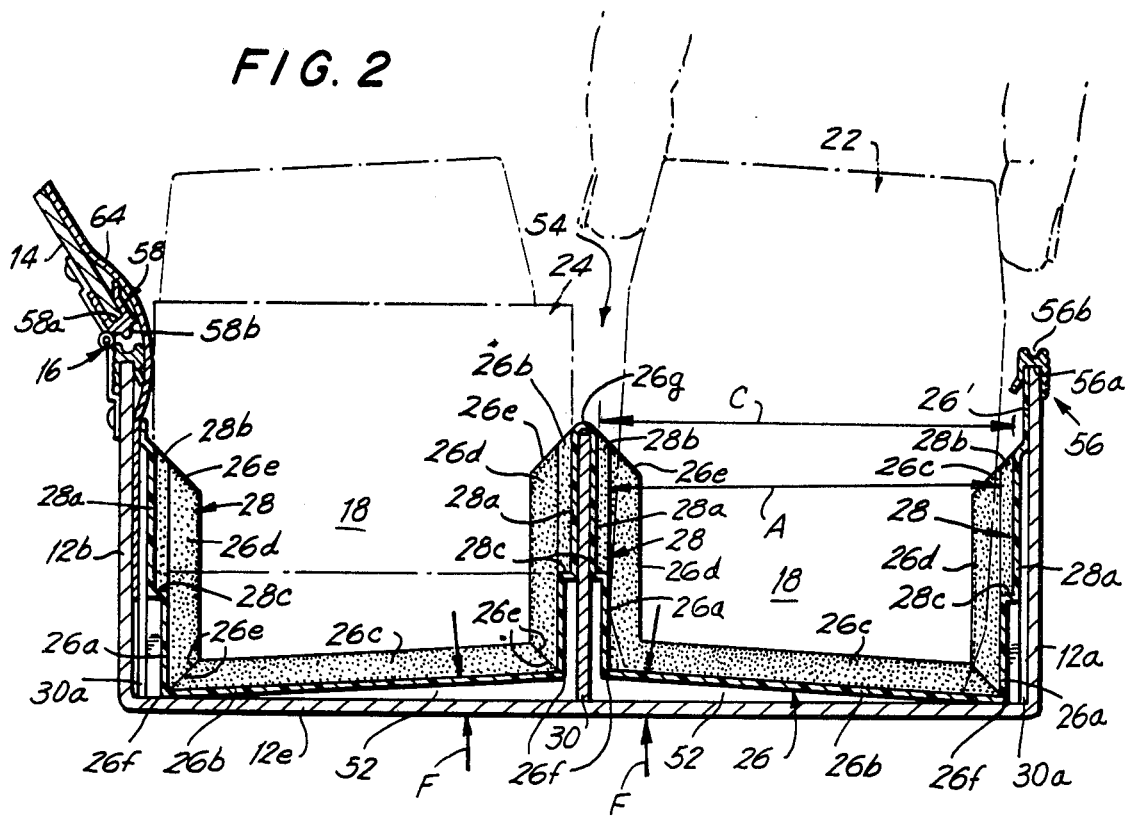
FIG. 2 is a cross-section of the carrying case shown in FIG. 1, taken along the line II—II showing in phantom outline how the compartments or bins receive both cassette storage boxes and standard 8-track cartridges and maintain the same securely therein, and further showing a variation of a presently preferred embodiment wherein the bottom walls of two adjacent rows of compartments are inclined relative to each other so as to separate the upper ends of the cartridges or cassette boxes to faciliate gripping thereof.

The carrying case is also provided with a cover 14 which is hingedly connected to the receptacle 12 by means of hings 16 as shown in FIG. 2. The cover 14 includes walls 14a-14d which respectively correspond to the receptacle walls 12a-12d. The cover 14 also includes a top wall 14e which dimensionally corresponds to the bottom ball 12e of the receptacle 12.

The cover 14 is moveable about the hinges 16 between a closed position and an open position as shown in FIG. 1 wherein the receptacle 12 is open to provide access to the interior thereof for inserting or removing magnetic tape enclosures as to be described.

A handle 13 is provided on the front wall 12a of the receptacle 12 to facilitate transportation thereof and a lock including elements 15a and 15b are provided on the front walls 12a and 14a respectively for locking the carrying case during transit and thereby prevent inadvertent opening of the case and loss of its contents.

While the present invention is not to be limited to specific types of magnetic tape enclosures, the presently preferred embodiment is particulary suited for interchangeably receiving and storing first and second encloses each having generally rectangular configurations. The first enclosure, for the purposes of the description that follows, is a standard 8-track cartridge which has a smaller width and a greater thickness than the corresponding dimensions of a second enclosure which in this case is a Norelco-type cassette storage box.

As will be noted from FIG. 1, a plurality of compartments 18 are provided each of which is similarly configurated. The end compartments of each row are designated by the reference numeral 18' and differ from the compartments 18 in that they are bounded by one of the walls 12c, 12d of the receptacle 12.

The 8-track cartridges are designated by the reference numeral 22 and the cassette boxes are designated by the reference numeral 24. Each of these magnetic tape enclosures is generally provided with markings 22a and 24a respectively which designate the title or other wise identify the magnetic recording. The portable carrying case 10 of the present invention permits both cartridges 22 and cassettes 24 to be interchangeably inserted and stored within the compartments 18, 18' in a manner which both securely retains these magnetic enclosures within the carrying case during transit as well as exposes the markings or designations 22a, 24a for easy identification when the cover 14 is opened.

The configurations of the compartments 18, 18' which permits simple and free interchangeability of the two above mentioned magnetic enclosures will now be described. Referring to FIG. 2, the compartments are shown to be formed from a single continuous sheet of material 26. Advantageously, the sheet of material 26 is made from a synthetic plastic material and is molded to assume the configurations described below and as an insert for the case. Each compartment 18, 18' is generally rectangular in shape as suggested above and is bounded on two sides by two substantially parallel wall portions 26a which are spaced from each other a distance "A" which is approximately equal to the width of the 8-track cartridge 22, and a further or bottom wall portion 26b which is substantially normal to the parallel wall pportions 26a. Each compartment 18, 18' is open on the side thereof opposite to the wall portion 26b for receiving the enclosures 22, 24.

Guide means at least partially bound the wall portions 26a, 26b of each compartment. In the presently preferred embodiment, the guide means include a bottom rib 26c and side ribs 26d which divide the rows into the compartments or separate the compartments as best shown in FIG. 1. The ribs 26c, 26d are similarly molded from the sheet of plastic material 26.

Figure 3:
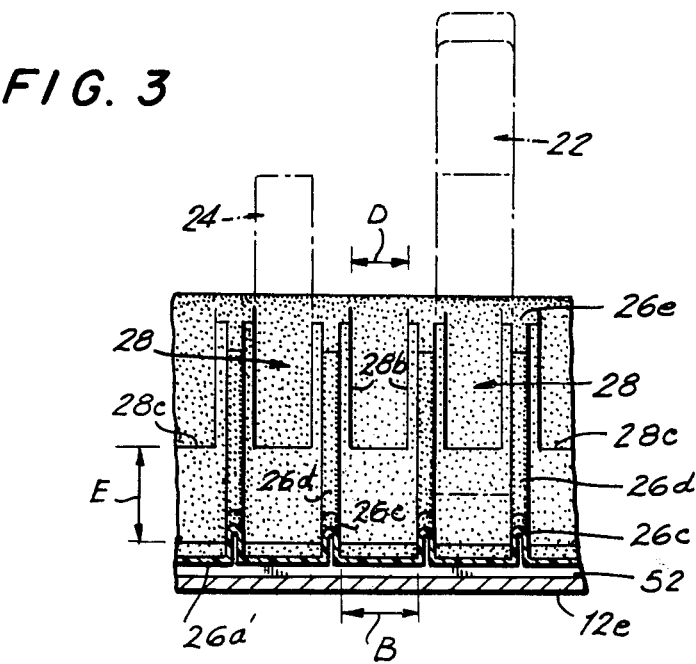
FIG. 3 is a fragmentary cross-section of the storage device shown in FIG. 1, taken along line III—III, showing in phantom outline the relative positions of both a cassette box and of an 8-track cartridge and the manner in which these magnetic tape enclosures are securely maintained within each compartment of the storage device.

The ribs 26c, 26d define a space therebetween having a thickness "b" which is approximately equal to the thickness of the cartridge 22. The ribs 26c, 26d thereby guide the 8-track cartridge 22 into the compartments 18 and prevent cartridges 22 from moving transversely therein with excessive play. The dimensions "A" and "B" are not critical and may vary within manufacturing tolerances of the standard dimensions for magnetic cartridges. As best shown in FIGS. 2 and 3, fully inserting a cartridge 22 into a compartment 18 brings the lower end of the cartridge into abutment against the side or parallel wall portions 26a, with the end surface of the cartridge resting on or abutting against the bottom wall portion 26b. The parallel wall portions 26a thereby prevent excessive lateral movements or play of the cartridge 22. On the other hand, as best shown in FIG. 3, the bottom ribs 26c and the side ribs 26d engage the major surfaces of the cartridge 22 and prevent the same from excessive transverse movements within the compartment.

In the presently preferred embodiment, the height of the walls 12a–12d extending upwardly from the bottom wall portion 26b is less than the height of the cartridge 22 so that the cartridge extends above or beyond the walls 12a–12d to facilitate the gripping of the cartridge for purposes of removal.

According to an important feature of the present invention, there is provided a pair of elongate rectangular recesses 28 one in each of the parallel side wall portions 26a. While two opposing recesses have been shown to be provided in each of the parallel side wall portions 26a, it will become apparent hereafter that even a single recess 28 may be sufficient to achieve the objects of the present invention.

As shown in the Figures, the elongate recesses 28 open at the compartment open ends and extend towards the bottom wall portions 26b. Each recess 28 forms a retaining side wall portion 28a, retaining end wall portions 28b and a bottom retaining wall portion 28c. The recesses thereby define a space therebetween which has a width "C" greater than the width "A" and a thickness "D" which is smaller than the thickness "B", with the dimensions "C" and "D" being selected to correspond to the width and thickness of cassette enclosures or boxes 24 and thereby suitable for securely receiving a cassette box 24 and prevents lateral and transverse movements of the cassette box within the compartment 18.

In the presently preferred embodiment, the recesses 28 extend from the compartment open ends to a point intermediate the compartment open ends and the bottom wall portions 26b to dispose the bottom retaining wall portion 28c spaced from the bottom wall portion 26b. The bottom retaining wall portion 26b is in the nature of a depth limiting shoulder and, when spaced as shown, limits insertion of the cassette boxes 24 into the compartment 18. In this manner, the depth limiting shoulders 28c compensate for the differences in height of the cartridges 22 and cassette boxes 24.

For reasons mentioned above in connection with the cartridge 22, the depth limiting shoulders 28c are spaced from the compartment open ends a distance smaller than the height of said boxes 24 to maintain at least a portion of the cassette boxes 24 projecting above the parallel wall portions 26a upon full insertion of the cassette boxes into the compartments 18 to thereby facilitate gripping of the cassette boxes. This feature is shown in FIGS. 2 and 3. Although this is not shown, the depth-limiting shoulders 28c may be spaced above the bottom wall portions 26b a distance which is equal to the difference in heights of the cartridges 22 and cassette boxes 24 to provide full compensation whereby all the magnetic tape enclosures project equally above the parallel wall portions 26a. This is accomplished by selecting distance "E" in FIG. 3 to be equal to the difference in heights of the aforementioned magnetic tape enclosures.

While the two rows 20 in FIG. 1 are shown extending along the width of the portable carrying case 10, this is clearly not a critical feature of the present invention. The series of compartments arranged into rows may be disposed in any desired fashion or orientation within the carrying case. When a series of aligned compartments are arranged in a row, the corresponding wall portions of each of the compartments are arranged in a row, the corresponding wall portions of each of the compartments together define respective common planes, as shown in FIG. 1. The compartments may be arranged into a single or a large number of rows as desired. Where the carrying case 10 is in the nature of a rectangular valise, one rectangular dimension of the tape receiving portion or receptacle 12 is approximately equal to at least one width of the compartments 18 and the other rectangular dimension of the tape receiving portion or receptacle 12 is approximately equal to a multiple value of the thickness of the compartments 18. It is of course possible to alternate the general orientations of the compartment 18 within the carrying case 10 instead of aligning all the compartments along parallel rows. This variation is intended to come within the spirit of the present invention.

Referring to FIG. 1, the receptacle 12 as well as the cover 14 are advantageously provided with mating peripheral edges formed by the edges of the walls 12a–12d and 14a–14d which abut against each other in the closed position of the cover 14 to sealingly close the valise 10 and protect the stored tapes 22, 24 from the elements during storage and transit. In the presently preferred embodiment, there are provided a pair of valances 56 and 58 which respectively cover the peripheral edges of the receptacle 12 and the cover 14. Each valance is in the nature of an extruded aluminum strip which is suitable for being mounted on and covering the peripheral edges of the receptacle 12 and of the cover 14. The valance 56 includes a pair of opposing grooves 56a and 56b, the groove 56a being dimensioned to receive the peripheral edges of the walls 12a–12d of the receptacle as well as the end extensions at 26' of the plastic sheet 26. On the other hand, the valance 58 has a groove 58a similar to the groove 56a and an elongate tongue 58b projecting outwardly in a direction opposite to the direction in which the groove 58a opens. The groove 58a of the valance 58 receives the edges of the walls 14a–14d. The cover 14 is hingedly mounted on the receptacle 12 to bring the peripheral tongue 58b within the groove 56b when the cover 14 is closed. In this manner, the mating groove 56b and tongue 58b serve as additional sealing means which prevent the entry of dust, humidity, and other atmospheric contaminants into the carrying case 10 to thereby protect the stored magnetic tapes.

As suggested above, each of the compartments 18 are molded and have a unitary construction. In accordance with the presently preferred embodiment, all the compartments 18, 18' are molded from a continuous sheet 26 of synthetic plastic material. As shown in the Figures, the compartments 18, 18' are arranged in rows to dispose the corresponding wall portions of each of the compartments in respective common planes and to form panels defining each of the common planes. Thus, in each row 20, the bottom wall portions 26b of the compartments 18, 18' together define a common plane. Similarly, the parallel or end wall portions 26a on each side of the compartments 18, 18' also together form common planes. In accordance with a presently preferred approach, the original plastic sheet from which the molded blank 26 is formed is flat. The ribs 26c, 26d as well as the recesses 28 are formed in the flat sheet and fold lines 26f are provided in the sheet 26 separating the panels formed by corresponding wall portions in each row of compartments. With such a molded plastic panel, assembly of the carrying case is particularly simple since the compartments may be formed by folding or bending the panel approximately 90° at each fold line 26f between a panel of side wall portions 26a and a panel of bottom wall portions 26b. In this manner, the rectangular configuration of the compartments 18, 18' is achieved.

Where more than one row of adjacent compartments are provided, the panels formed by the parallel wall portions 26a which are proximate to each other are connected by means of connecting portions 26g bridging the adjacent parallel wall portion panels of the adjacent rows to connect the same and limit excessive movement of the parallel wall portions 26a, which movements may otherwise materially change the width dimensions of the compartments 18, 18'.

When the ribs 26c, 26d extend along the entire lengths of the side wall portion 26a and bottom wall portions 26b as shown, the ribs are advantageously provided with inclined ends 26e which define angles of approximately 45° with the length direction of each of the respective ribs so that when the blank is folded about the fold lines 26f, the inclined ends 26e are brought into abutment without interfering or preventing folding of the blank as above described. With such an arrangement, a continuous dividing or separating wall is formed by the ribs. It should be clear, however, that the specific configuration of the ribs is not critical for the purpose of the present invention and it is similarly not important that the ribs extend along the entire length of the wall portions. Thus, the same results could be achieved by only providing, for example, side ribs 26d and omitting the bottom ribs 26c. Other rib configurations which, however, at least partially bound the wall portions 26a, 26b are similarly contemplated by the present invention.

When more than one row of compartments is to be formed from a single, continuous plastic sheet, the bent connecting portions 26g may also serve as fold lines about which the two resulting back-to-back panels of side wall portions 26a may be folded 180° relative to each other as suggested in FIG. 2. Particularly in this instance, reinforcing means in the form of a separating wall 30 is provided which extends between the case bottom wall 12e and the bent connecting portions 26g. The separating wall 30 is made from a rigid material and is fixedly connected to the case bottom wall 12e by any conventional means. The separating wall 30 reinforces and rigidifies the parallel wall portions 26a which are made from a relatively flexible and resilient molded plastic material to prevent significant changes in the width dimensions "A" and "C" of the compartments. For similar reasons, as mentioned above, the valence 56 covers and secures the upper edge of the extension 26' of the plastic sheet 26 and similarly prevents excessive movements of that associated panel of side wall portions 26a. Advantageously, filler walls 30a are disposed behind each of the panels of side wall portions 26a to maintain the integrity of the molded shape and to prevent excessive flexing and deformations of the compartments.

In the presently preferred embodiment, the bottom wall portions 26b lie flat against the bottom case wall 12e. However, in a modification of the presently preferred embodiment, as shown in FIGS. 2 and 3, each bottom wall portion 26b may be inclined slightly relative to the case bottom wall 12e an amount designated by the angular quantity "F". By slightly inclining or offsetting the bottom wall portions 26b, a space 52 is formed below these wall portions which is maintained by selecting the height of the separating wall 30 slightly larger than the heights of the filler walls 30a. Any other suitable means for maintaining the compartments oriented in the position shown may be utilized. When the compartments are inclined as suggested, a space 54 which normally exists between adjacent magnetic tape enclosures is increased to facilitate insertion of a finger into the space and gripping of a desired cassette or cartridge.

To enhance the esthetic appearance of the carrying case, the molded plastic sheet 26 may be provided with a decorative surface finish. For example, the molded plastic sheet 26 may be covered with a crushed flock velvet material. Other natural or simulated materials may similarly be used to enhance the surface finish and appearance of the compartment interiors. In this connection, the present case being described further includes panels 60, 62 and 64 which are advantageously provided with the same surface finish as is provided on the molded plastic sheet 26 to conceal the hinges 16 as well as provide an appearance of continuity of similar material used throughout the interior of the carrying case 10.

As suggested above, the cartridges 22 and the cassette boxes 24 are each received within the compartments 18, 18' with little or no clearance. Advantageously, for the purposes of a carrying case, the magnetic tape enclosures are snuggly received within the compartments to thereby prevent the tape enclosures from moving in longitudinal directions along the side wall portions 26a. To minimize such longitudinal movements, the interior height dimension of the carrying case 10 when the cover 14 is closed is advantageously selected to be approximately equal to the height dimension of the cartridges 22. In this manner, when the cover 14 is closed, the top wall 14e of a cover abuts against the uppermost edge or surface of the cartridges 22 and prevents longitudinal movement thereof. While a snug fit of the magnetic tape enclosures within the compartments minimizes such longitudinal movement, prevention of these movements by the cassette boxes 24 may be achieved by selecting the distance "E" equal to the difference in heights of the cartridges 22 and cassette box 24 to thereby bring the end surfaces of the cassette boxes to the same level as the corresponding surfaces of the cartridges 22. Now, when the cover 14 is closed, the top wall 14e would abut against both cartridges as well as the cassette boxes and prevent the undesired movements abovedescribed.

Figure 4:
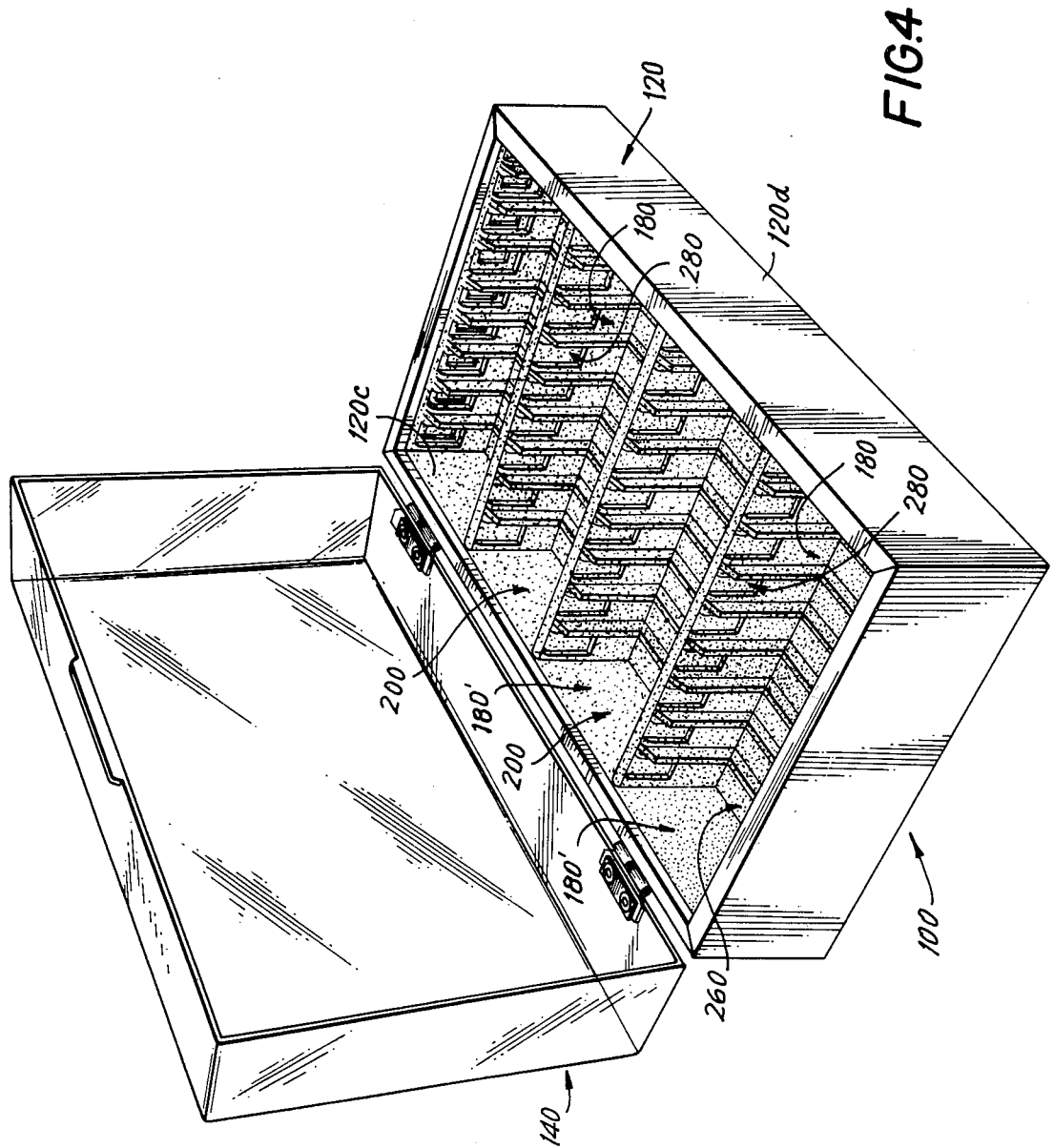
FIG. 4 is a perspective view of another case in the form of a cabinet module for magnetic tape enclosures in accordance with the present invention, showing a substantially identical plastic molded insert or sheet of material, but with four transverse rows for storing the magnetic tape enclosures.

In the embodiment of FIG. 4, a storage cabinet unit or module 100 is illustrated, in a front "opened" perspective view, having a top dust cover or closure 140, which, if desired, may be suitably hinged to the cooperatively associated receptacle 120. This cabinet module 100 is for all practical purposes virtually identical to the case 10, except that the continuous plastic molded sheet or plastic insert 160 is formed into four transverse rows 200, and the dust cover or top closure 140 is preferably made from a suitably transparent material. This case 100 is not provided with any latching means or handle or other carrying means as is the case 10, since it is intended to be primarily used to provide a more permanent storage for magnetic tape enclosures 22 and 24, and is not intended to be carried about. It can, however, be moved from one location to another. In addition, if desired, the case can be provided with suitable gripping means, such as an oppositely disposed pair of handles (not shown) for transporting the case 100 from one place to another.

In this alternate modification, the plastic insert sheet 260 is also suitably provided with a decorative surface finish, such as a flocked material, and the compartments 180 are configured and formed in the same exact and identical manner as the compartments 18 of the embodiment of FIGS. 1-3. The end compartments of each row 200 are designated by the reference numeral 180' and differ from the compartments 180 of the embodiment of FIGS. 1-3 in that they are bounded by one of the walls 120c, 120d of the receptacle 120. In this cabinet module 100, receptacle walls 120c and 120d which comprise the rear and front walls correspond to the receptacle walls 12c and 12d (of the valise embodiment) which in actuality are the end walls since the rows 200 of the cabinet module 100 are transversely shown as compared to the rows 20 of the valise embodiment 10 where the rows are longitudinally shown.

The entire structure of the molded plastic sheet 260 including the guide means or ribs, and wall portions which form the elongate rectangular recesses 280 is identical to the structure of the plastic sheet 26. It is not believed necessary, therefore, to further describe the embodiment of FIG. 4, other than to state that the cabinet module 100 performs the same function in the same way as the carrying case 10, with respect to each compartment of an insert interchangeably receiving and/or storing a plurality of magnetic tape enclosures of either the 8-track cartridge type or the cassette type.

FIGS. 5-7 illustrate another preferred embodiment of the invention wherein, in effect, the insert and case are formed together as a unitary assembly; the insert per se or means thereof forming same comprising the guides or dividers and wall portions formed into the walls of the case, as will be described hereinbelow in greater detail. As shown therein, the case 300 comprises a lower receiving and storing portion 310 which is adapted to be carried about, if desired, and an upper cover portion 312 which may be suitably hinged to the lower portion 310. In this modification, the cover portion 312 is transparent so as to enable the contents of the case to be viewed without the need to open the cover. It is well recognized that most magnetic tape enclosures have identifying literature on an end thereof and the various tape enclosures would be positioned in the compartments with such ends facing upwardly.

A pair of conventional hinges 314 in the form of "detent means", as is well known in the plastic box industry, may be used to pivotally mount the cover portion 312 to the receiving and storing portion 310. A resilient apertured tongue 316 on the cover portion 312 engages with suitable projections 318 (which extend through the apertures of the tongue) on the lower portion 310 to securely hold and lock the cover portion 312 in a closed and sealed position atop the lower portion 310. Both the lower and upper or cover portions 310 and 312 may be fabricated from any suitable plastic material which is capable of withstanding rough handling, such as an ordinary valise or luggage is expected to be exposed to during its lifetime. As the case may be a "constant companion" to a party, consequently, both portions may be made from polypropylene which is strong, tough and relatively rigid and has other requisite characteristics which are desirable. Other well known like plastics may also be utilized.

The lower receiving and storing portion 312 is suitably provided with twelve rectangular bins or compartments 320 disposed suitably in a single row, as best shown in FIG. 5. Each compartment 320 is formed by wall portions 321 and ribs or guide means 322 extending generally from the bottom or further wall portion 324 of the lower portion 310 to the upper edge portion 326 of the wall portions 321. Of course, the end compartments 328 and 330 utilize the adjacent end walls, 329 and 331, respectively, as one of the guide means 322 which form the last compartments of the row.

These guide means 322, as noted hereinbefore, at least partially bound said wall portions of each compartment to define a space having a thickness "B" equal to a second predetermined distance approximately equal to the thickness of the first enclosure for guiding the first enclosures (cartridges 22) into said compartments and preventing the first enclosures from moving therein.

Provided on at least one of the spaced wall portions 321 of each compartment 320 are further inwardly extending wall portions 33. These wall portions 332 are spaced disposed inwardly from a pair of oppositely disposed inwardly extending wall portions 332, provided on the other side of the lower portion 312. The cartridge 22 has a width A representing a first predetermined distance approximately equal to the width or space between oppositely disposed wall portions 332.

These wall portions 332 also define a thickness smaller than said second predetermined distance so as to securely receive therebetween a second enclosure or cassette 24. A centrally located retaining wall portion 334 preferably disposed on opposite sides of the lower portion 310 defines thereabove a space between wall portions 321 having a width greater than said first predetermined distance. A box cassette 24 may therefore be supported on said retaining wall portions 334 between said further inwardly extending wall portions 332 and between said wall portions 321, whereas a cartridge 22 is supported on said bottom wall portion 324 between said guide means 322 and between said further inwardly extending wall portions 332.

In the modification of FIGS. 8-10, two parallel rows of twelve compartments each are shown separated by a longitudinal divider 335 for holding 24 8-track tapes (cartridges) and/or cassettes. In this structure, the cover 350 may also be transparent and it may be removably mounted or it may be suitably hinged, as best shown in FIG. 9 by the reference number 352. The cover 350 may also simply rest on the upper edge portion 326 with the peripheral skirt portion 337 maintaining the cover 350 in place atop the lower portion 354. In the embodiment shown, the hinge 352 which may be of any type or any material is suitably secured to both the cover 350 and the lower portion 354, such as by means of adhesives, fasteners, heat sealing, etc. In a like manner, a latching aperture tongue 356 is also used to lock the cover 350 in place by engaging with the projections 358. If desired, suitable end gripping means 360 of conventional construction may also be utilized at opposite ends of the case to facilitate holding and carrying the case. In all other aspects, the modification of FIGS. 8-10 is otherwise generally identical to that described hereinabove with respect to FIGS. 5-7 so that like numerals have been used throughout FIGS. 8-10 for ease of illustration as well as with respect to FIGS. 11-13 for similar reasons.

In FIGS. 11-13, a cover 370 is shown integrally formed with the lower portion 372 with a "living hinge". Such type of structure can be integrally molded, for example, in an injection molding machine. A handle portion 374 nevertheless must be separately made and assembled to or inserted into the apertured cover portion 370 at 376 and 378. Such a construction lends itself to mass production of a relatively inexpensive carrying case for the home, cars and/or boats. In a like manner, the modification of FIGS. 1-13 is otherwise generally identical to that described hereinabove with respect to FIGS. 5-7 or 8-10. The handle 374, it should be noted, however, lies flush within the cover 370 when not in use, as a result of the recess portion 376 which is provided in the cover portion 370.

As shown in the drawings, the ends walls, the walls 321, guide means 322, wall portions 332 and the retaining means 334 are all slightly tapered so as to provide a "mold relief" and thus facilitate removal or withdrawal of the case from an injection mold. Of course, if the case is not molded, there is no need for such draft or other tapered reliefs.

As shown in FIGS. 5-13, each of the tandem storage compartments is generally defined by a width "C" (between opposite walls 321) greater than the width "A" (between opposite wall portions 332 and 334) and a thickness "D" (between wall portions 332) which is smaller than the thickness "B" (between wall portions 322), with the dimensions "C" and "D" being selected to correspond to the width and thickness of cassette enclosures or boxes 24; and the compartments are such that tape enclosures can be interchangeably received and stored in said compartments.

Although not shown, the embodiments of FIGS. 5-13 may also be suitably lined with a flocked material or other decorative surface finish, if desired. In addition, the rows of compartments or bins may be disposed transversely of the case (as shown by FIG. 4) in lieu of longitudinally disposed rows as shown herein with respect to all of the other embodiments of the invention.

In each of the embodiments of the invention shown in FIGS. 5-13, the center guide means 322' is somewhat larger in size (but not thickness) and has a U-shape cutout extending from near the bottom of the lower portion to provide a more rigid reinforcement and added strength to the case. Suitable feet in the form of dimples 380 are also provided on each outside corner of the lower portion of the case to preclude the marring of a surface upon which the case is placed.

It will be noted that the wall portions 332 and 334 form relatively thin vertical rib-like members and that they extend inwardly toward the center of the lower portion 312 an equal distance so that they in effect all serve to position the cartridges 22 in place between the guide means 322. It should also be appreciated that the wall portions 332 and 334 need not necessarily extend from the bottom wall 324 of the lower portion 312, but that they can simply be short ribs of a length sufficient to perform the function required of same. For example, the wall portions 334 may be extremely short in length and in fact may be a projection for a cassette box to rest upon. However, the wall portions 332 should extend upwardly to a height sufficiently beyond the wall portion 334 or projection so as to maintain a cassette box securely in place. In a like manner, the guide means 322 need not necessarily extend the full wall length of the portion 312, and need only be as long as necessary to provide a compartment place for holding a cartridge securely positioned therebetween.

Another alternate form of the invention can be a case designed to be wall mounted with the bottom wall 324 secured to a vertical surface so that the open end faces away from the wall surface. A cover may or may not be utilized with such structure. The same case can be free standing or placed on a desk surface or other shelf-type surface with one longitudinal side wall resting on the substrate or surface. In such structure, the case should preferably be of generally rectangular shape or provided with means to maintain the case relatively level, if necessary.

Note that the same general construction of the innards of the present case can be provided or incorporated in any other type of storage container, such as, by way of example only, in my earlier identified U.S. Pat. No. 3,889,817.

If desired, as another further embodiment of the invention, one wall portion 332 may be eliminated. In such case, the distance "D" would be governed by the spacing between the remaining wall portions 332 and the guide means 322. Additionally, the remaining wall portions 332 and 334 may be formed as a single wall portion in lieu of two separate wall portions with the necessary height differential provided by a ledge portion spaced from the bottom 324 of the lower portion 312 to correspond to the height of the separate centrally disposed wall portion 334.

Additionally, if desired, only alternate compartments may be of the interchangeable type and the remaining compartments may be of the type adapted to receive and store either a cartridge or a cassette. In effect, any combination of compartments may be employed depending upon what ratio of storage capability between cassettes and cartridges is desired.

Although the present invention has been described in some detail by way of illustration and example for purposes of clarity of understanding, it will, of course, be understood that various changes and modifications may be made in the form, details, and arrangements of the parts without departing from the scope of the invention as set forth in the following claims.

What is claimed is:

1. A case having side and end walls adapted for interchangeably receiving and storing two differently sized magnetic tape enclosures having generally rectangular configurations, the first enclosure having a smaller width and a greater thickness than the corresponding dimensions of the second enclosure, and having a height greater than the height of the second enclosure; said case having at least one row of tandem storage compartments, at least one of which is adapted to interchangeably receive a first or a second dimensioned magnetic tape enclosure, said compartment being generally rectangular in configuration and bounded on two sides by wall portions spaced from each other a first predetermined distance approximately equal to the width of the first enclosure to receive the same therebetween and a further wall portion substantially normal to said wall portions, said compartment being open on the side thereof opposite said further wall portion for receiving the enclosures; and guide means at least partially bounding said wall portions of said compartment to define a space having a thickness equal to a second predetermined distance approximately equal to the thickness of the first enclosure for guiding the first enclosure into said compartment and preventing the first enclosure from moving therein, wall means spaced from said wall portions and cooperating therewith to form an elongate rectangular recess which opens at said compartment open end and is spaced from said further wall portion so as to form a depth limiting shoulder or ledge adapted to maintain at least a portion of said second enclosure projecting above said wall portions upon full insertion of said second enclosure into said compartment, each recess forming retaining wall portions which define a space having a width greater than said first predetermined distance and a thickness smaller than said second predetermined distance suitable for securely receiving a second enclosure to thereby prevent movements of a second enclosure within said compartment, whereby the manual gripping of any second enclosure is facilitated by said depth limiting shoulder, and whereby said compartment can interchangeably receive either a first or a second enclosure and maintain either enclosure securely therein by insertion through an associated compartment open end and respective cooperation with either said guide means or said retaining wall portions of said recess.

2. The case according to claim 1, wherein each of said compartments is adapted to interchangeably receive a first or a second dimensioned magnetic tape enclosure.

3. The case according to claim 2, wherein said wall portions comprise first projections of a generally uniform depth extending inwardly from the side walls of said case.

4. The case according to claim 3, wherein said wall means spaced from said wall portions comprise the side walls of said case, and said elongate rectangular recess being formed by one or more of said projections and said depth limiting shoulder or ledge.

5. The case according to claim 4, wherein said depth limiting shoulder or ledge is formed by a further separate projection of generally uniform depth but shorter height than said first projections extending inwardly from the side walls of said case, and said further separate projections being spaced from said first projections.

6. The case according to claim 5, wherein pairs of said first projections are spaced and disposed generally parallel to said further separate projection in each of said compartments, such that said pair of projections and said further separate projection and said wall means spaced therefrom, cooperate to form said elongate rectangular recess on opposite side walls of said compartment.

7. The case according to claim 1, including a cover for said case which is cooperatively associated therewith for aiding in protecting said magnetic tape enclosures from dust and other atmospheric contaminants.

8. The case according to claim 7, wherein said cover is pivotably or hingeably mounted to said case.

9. The case according to claim 7, wherein said cover and said case are provided with means for holding said cover to said case.

10. The case according to claim 7, wherein said cover is transparent.

11. The case according to claim 7, including means for facilitating carrying of said case.

12. The case according to claim 11, wherein said means comprises a handle on at least one wall portion of said case.

13. The case according to claim 12, wherein said handle is attached to the top wall portion of said cover.

14. The case according to claim 13, wherein said handle is pivotably mounted.

15. The case according to claim 8, wherein said cover and said case are connected together by means of an integral hinge.

* * * * *